United States Patent
Ott

(10) Patent No.: US 6,626,425 B2
(45) Date of Patent: Sep. 30, 2003

(54) GASIFICATION DEVICE

(75) Inventor: Wilfried Ott, Langenhagen (DE)

(73) Assignee: Ott GmbH, Langenhagen (DE)

( * ) Notice: Subject to any disclaimer, the term of this patent is extended or adjusted under 35 U.S.C. 154(b) by 0 days.

(21) Appl. No.: 09/797,056

(22) Filed: Feb. 23, 2001

(65) Prior Publication Data

US 2002/0043729 A1 Apr. 18, 2002

(30) Foreign Application Priority Data

Feb. 23, 2000 (DE) .......................... 100 08 449
Nov. 20, 2000 (EP) ............................ 00125411

(51) Int. Cl.$^7$ ................................. B01F 3/04
(52) U.S. Cl. ................ 261/122.1; 261/124; 210/220
(58) Field of Search .................... 261/121.1, 122.1, 261/122.2, 124, DIG. 70; 210/220

(56) References Cited

U.S. PATENT DOCUMENTS

| | | | | |
|---|---|---|---|---|
| 3,206,178 A | * | 9/1965 | Lamb ..................... | 261/122.1 |
| 3,603,509 A | * | 9/1971 | Nechine ................. | 261/122.1 |
| 4,060,486 A | * | 11/1977 | Schreiber .............. | 261/122.2 |
| 4,165,286 A | * | 8/1979 | Schreiber et al. ...... | 261/122.2 |
| 4,954,296 A | * | 9/1990 | Ott ........................ | 261/122.2 |

FOREIGN PATENT DOCUMENTS

| | | | | |
|---|---|---|---|---|
| DE | 529020 | * | 7/1931 | .............. 261/122.1 |
| DE | 27 01 656 | | 6/1978 | |
| DE | 3319161 A1 | * | 11/1984 | .............. 261/122.2 |
| DE | 38 19 305 | | 12/1989 | |
| DE | 42 23 942 | | 1/1994 | |
| DE | 197 22 781 | | 12/1998 | |

* cited by examiner

Primary Examiner—C. Scott Bushey
(74) Attorney, Agent, or Firm—Collard & Roe, P.C.

(57) ABSTRACT

A gasification device is described for the introduction of a gas into a liquid, in particular of air into waste water. The gasification device has a blower body element, which carries a membrane made of an elastic material with perforation slits. The gasification device also has a longitudinal ridge arranged in an area located at the top, related to the installation location. When the gas feed is switched off and the hydrostatic pressure of the waste water is imposed, an axial fold of the membrane is formed in this upper area. This area is, at the same time, free of perforation slits.

9 Claims, 4 Drawing Sheets

GASIFICATION DEVICE

BACKGROUND OF THE INVENTION

1. Field of the Invention

The invention relates to a gasification device for the introduction of air into wastewater.

2. The Prior Art

A gasification device of this generic type is known from German Patent No. PS 38 19 305. An introduction body element of this gasification device is made of a plastic and the membrane of an elastomer. The membrane contains perforation slits through which the gas can pass into the waste water which is to be treated. It can also pass into areas without perforation slits, e.g., directly at a gas distribution slot, to prevent an indirect and excessively concentrated emergence of gas at that point.

The basic design of this gasification device has been tried and tested. With regard to the selection of the material for the membrane, considerable progress has been made recently, which has largely succeeded in reducing deposits of slime and encrustations by organic and inorganic substances as well as losses of softener. The length of service life which is possible with this progress is limited by the fact that mechanical damage can occur to the membrane due to cracks which did not previously occur due to the earlier replacement required of the membrane.

SUMMARY OF THE INVENTION

It is an object of the present invention to extend the service life of the membrane of a gasification device by reducing the propensity to crack formation.

This and other objectives are achieved by providing a gasification device for the introduction of air into wastewater having a blower body element, a membrane surrounding the blower body element and a longitudinal area of said membrane that forces the creation of an axial fold of said membrane in an upper area.

The solution of the invention required extensive investigations into the causes of cracks, which was difficult because a gasification device cannot be monitored in practical operation. The following was discovered:

Crack formation occurs if the gasification device is not operated continuously but is intermittently operated. The reason for this intermittent gas introduction is the treatment in clarification plants for a number of types of waste water. This is based initially on exploiting the ability of bacteria, predominantly aerobic bacteria, to aerate organic substances, i.e., to break them down in the final analysis into carbon dioxide, water, nitrates and final analysis into carbon dioxide, water, nitrates and sulphates. A precondition for this in aerobic operating systems is an adequate aeration of the activated sludge in the waste water. The aeration is then stopped and the biological waste water purification with anaerobic agents, i.e., bacteria which live off chemically-bonded oxygen and therefore carry out reductive decomposition, increases in importance.

Due to intermittent operation, pauses arise in which no gas is introduced into the waste water, and the membrane is then no longer inflated by a gas cushion between its inner side and the outer side of the introduction body element. The inflation forms a fold in the upper part of the membrane. The research into the causes identified the following reasons for this:

When the aeration process is switched off, the hydrostatic pressure in the waste water of the clarification plant has the effect of pressing the membrane against the introduction body element. However, because this does not always take place uniformly it is possible that an uncontrolled fold formation takes place, which runs into the area of the perforation slits, and thereby gradually leads to the fatigue of the material.

Specifically, the area of the membrane with the perforation slits is less stiff than the remaining unperforated area. Therefore, it tends to initiate uncontrolled fold formation in the perforated area. Once a fold has started in that area, it continues to develop. However, the perforation slits already represent a weakness in the material, and facilitate tearing of the membrane as the fatigue of the material progresses.

The effect of fold formation is further facilitated if the membrane is "oversize"; i.e., its circumference in the relaxed state is greater than the circumference of the introduction body element. This is frequently the case in practice, since an oversize is already present at manufacture facilitates fitting and the membrane can be made taut without resistance over the introduction body element. In addition to this, a sustained expansion of the membrane occurs with time during operation due to the imposition of pressure from within.

Within the gasification device according to the invention, uncontrolled fold formation is avoided, in that a controlled fold formation is forced into effect. In this situation, the controlled fold formation is effected in an area of the membrane which is free of perforation slits and therefore not already weakened. Once a fold occurs, the "excess" material which is present can dam up the circumference of the membrane in this fold, resulting in no opportunity for additional fold formation. Accordingly, the other areas of the membrane, in particular the areas with the perforation slits, continue to lay smoothly against the introduction body element under the effect of hydrostatic pressure when the gas feed is switched off, and is therefore not subjected to folding.

This arrangement of having fold-forming material in the upper area, related to the installation position, makes use of the tendency already present towards uncontrolled fold formation in the upper half of the gasification device. In this situation, the hydrostatic pressure in the lower part is less than in the upper part, and the membrane is initially in contact at the bottom of the introduction body element when the gas feed is switched off.

Without the arrangement of the present invention, this process would not uniformly take place since flows in the waste water also play a part, and the forces resulting from this are superimposed on the hydrostatic pressure. It is then possible for folds to form beneath the crest, in other words the highest-lying line of the membrane, which has been demonstrated to be the case in practice.

According to a further embodiment, the arrangement can be formed by a longitudinal section of the membrane with an impressed camber radius which is smaller than the mean camber radius of the membrane measured in the fitted position on the introduction body element.

The hydrostatic forces, which take effect radially on the membrane when the gas feed is switched off, support the inclination towards fold formation of the more sharply cambered area of the membrane.

In another embodiment, the arrangement is provided by a longitudinal web, which projects over the circumference of the casing surface of the introduction body element.

The advantage of this design is it is possible to avoid preliminary deformation of the membrane. In addition, when the membrane is contracted, it is more cambered at one point than in the other areas. The same effect of the hydrostatic forces taking effect radially on the membrane is then exploited, which also leads to fold formation at the desired point with the pre-deformed membrane.

Several variants are possible with the design and arrangement of the longitudinal web; for example, the web can be an integral part of the introduction body element.

This requires a modification of the manufacturing mold in comparison with the conventional design. However, with subsequent manufacture, no relevant additional costs are incurred since the fitting of the membrane to the introduction body element can take place without change.

In addition, the longitudinal web may also be a separate component, which can be inserted between the membrane and the introduction body element.

With this design, it is possible to avoid modification of the manufacturing mold, although an additional working stage is required during assembly. It may also be necessary for the longitudinal web to be fixed to the introduction body element.

A further embodiment provides that the longitudinal web is secured on the side of the membrane which faces inwards. Therefore, it is possible to avoid modification of the manufacturing mold for the introduction body element. However, an additional working stage is still necessary.

The longitudinal web can also be arranged on the inwardly facing side of the membrane and be an integral part thereof.

In this embodiment, a modification to the mold for the manufacture of the membrane is necessary. However, no relevant additional costs are incurred in the subsequent installation.

In a further embodiment, the arrangement can be formed by a longitudinal area of the membrane with an impressed camber radius, which provides a camber directed inwardly with respect to the introduction body element.

In this case, the camber radius is smaller than the mean camber radius of the membrane when measured when mounted on the introduction body element.

When the gas feed is turned off, the hydrostatic forces taking effect radially on the membrane cause a fold formation in the pre-treated longitudinal section of the membrane. In this situation, the camber radius in the centre of this longitudinal section increases, while the laterally delimited areas form folds with the camber in the opposite direction.

Finally, it is possible for a longitudinal groove to be arranged in the introduction body element in the area of the longitudinal area of the membrane.

This longitudinal groove allows for an inward deflection of the increasing crest of the longitudinal area, under the influence of the hydrostatic pressure, in relation to the introduction body element.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1A:
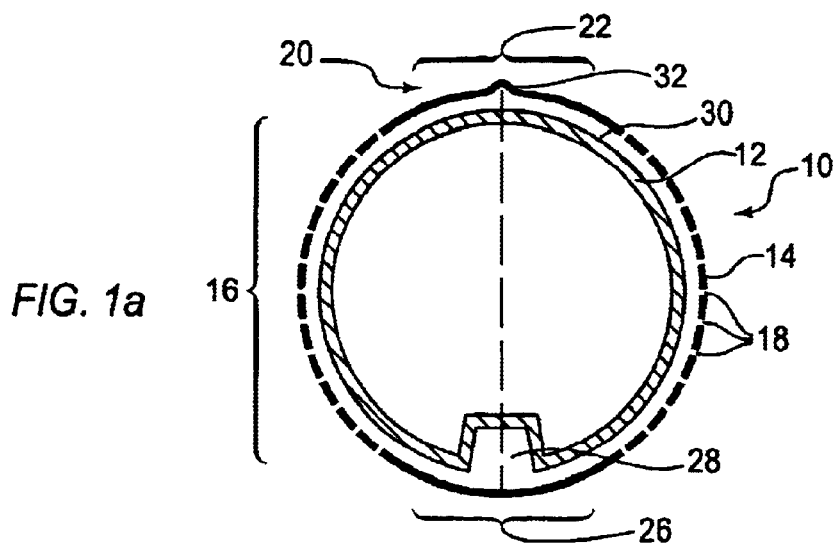
FIGS. 1a–c shows a cross-section through a gasification device with a preformed membrane of a camber directed outwards in three contraction phases.

Referring now in detail to the drawings and, in particular, FIGS. 1 to 4 show cross-sections through a gasification device 10. Gasification device 10 contains an introduction body element 12 and a membrane 14. Membrane 14 features areas 16 with perforation slits 18 for the introduction of a gas into the fluid, and further areas 22, 26, in which no perforation slits are present. Area 26 covers a groove 28 running longitudinally in the introduction body element 12, which serves to carry out the longitudinal distribution of the gas being introduced. The reason for the absence of the perforation slits in this area is to prevent the indirect emergence of the gas being conducted via groove 28 through covered membrane 14 in the area of the groove. Rather, an overpressure is created, which will raise membrane 14 with the formation of an annular space for a circumferential gas distribution of the introduction body element 12, resulting in the access of gas to all perforation slits 18 and therefore an outlet over a larger surface area.

While gas distribution groove 28 and area 26 of membrane 14 which covers it, without perforation slits, are located on the bottom of the perimeter in relation to the installation position of the gasification device 10, a further area 22 without perforation slits, is located opposite, on the top or vertex of the perimeter in relation to the installation position. located opposite, on the top in relation to the installation position.

In this case, means 20 are provided to form an axial fold of the membrane 14 in this upper area 22 when the gas feed switched off and the hydrostatic pressure of the waste water being present.

Figure 1B:
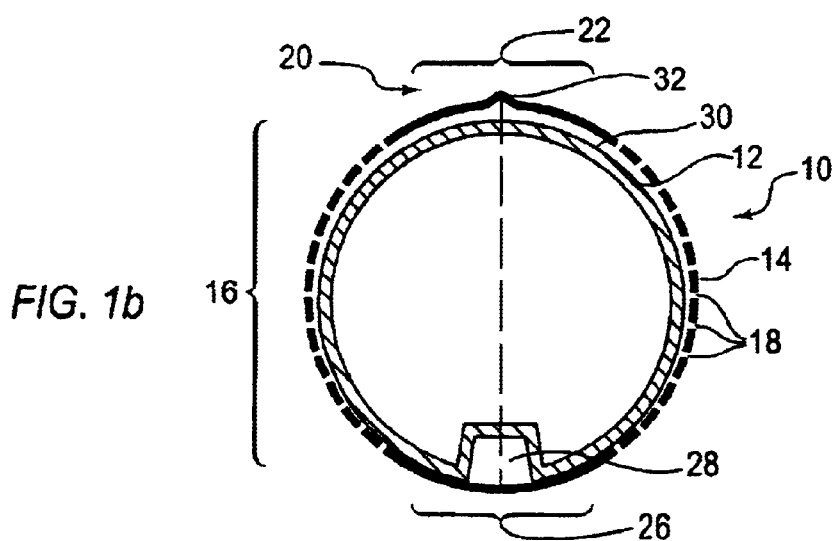
Figure 1C:
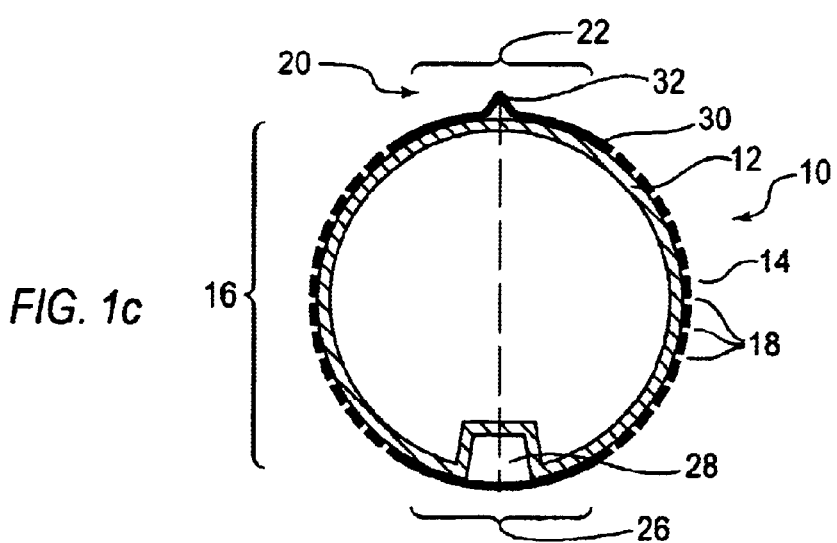

FIG. 1 shows means 20 being formed by a longitudinal area 32 of membrane 14 with an impressed camber radius smaller than the mean camber radius of membrane 14, measured in the fitted state on the blower body element 12, and is directed outwards.

Figure 2A:
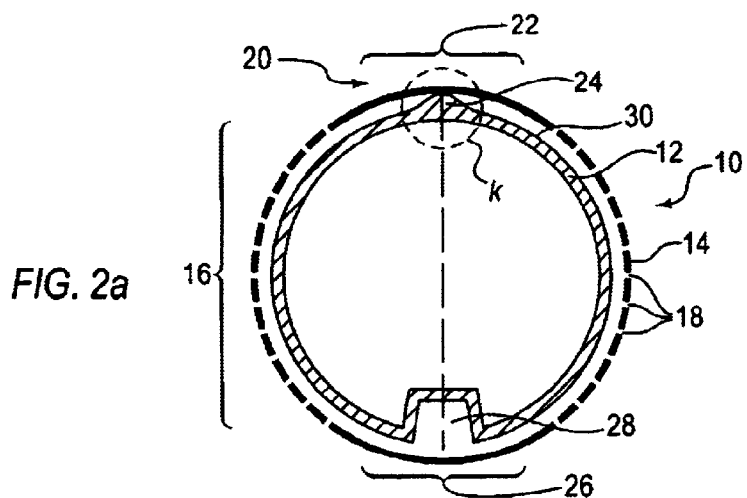
FIGS. 2a–c shows a cross-section through a gasification device with a web in three contraction phases.
Figure 5:
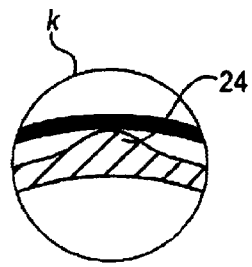
FIG. 5 shows a magnified view of the longitudinal ridge integrally formed with the blower body element.
Figure 2B:
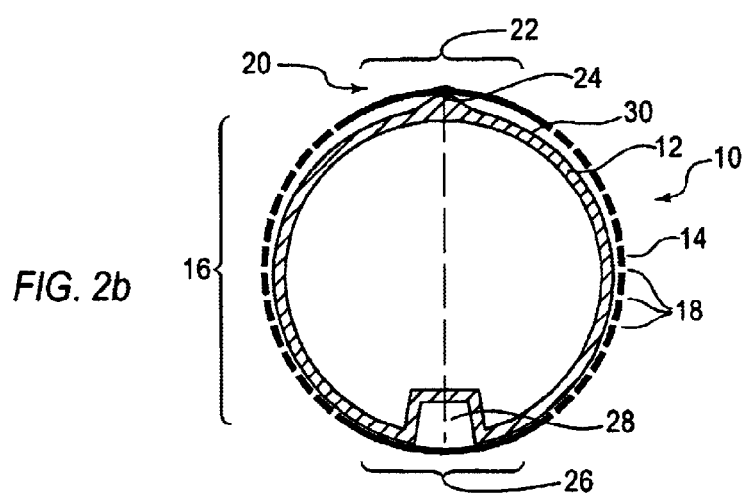
Figure 6:
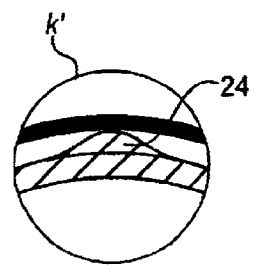
FIG. 6 shows a magnified view of the longitudinal ridge as a separate element.
Figure 2C:
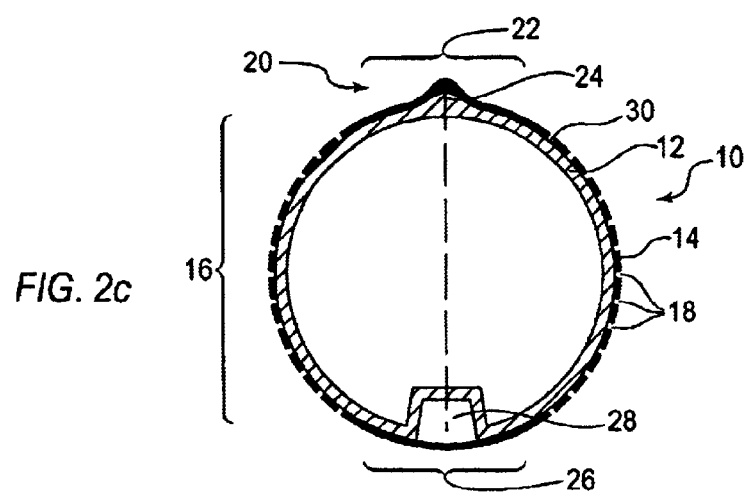
Figure 7:
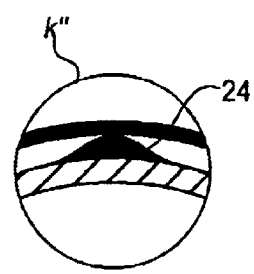
FIG. 7 shows a magnified view of the longitudinal ridge integrally formed with the membrane.

FIG. 2 shows 20 being formed by a longitudinal ridge 24, which projects over the circumference or perimeter 30 of the casing surface of the blower body element 12. Longitudinal ridge 24 may be integrally formed with blower body element 12 as shown in magnified view k of FIG. 5. Magnified view k' of FIG. 6 shows longitudinal ridge 24 as its own element, while close-up view k" of FIG. 7 shows longitudinal ridge 24 integrally formed with membrane 14.

Figure 3A:
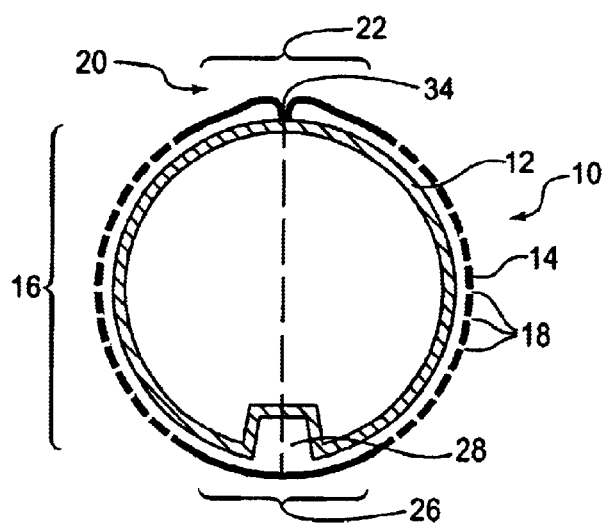
FIGS. 3a–c shows a cross-section through a gasification device with a preformed membrane, with a camber directed inwards in three contraction phases.
Figure 3B:
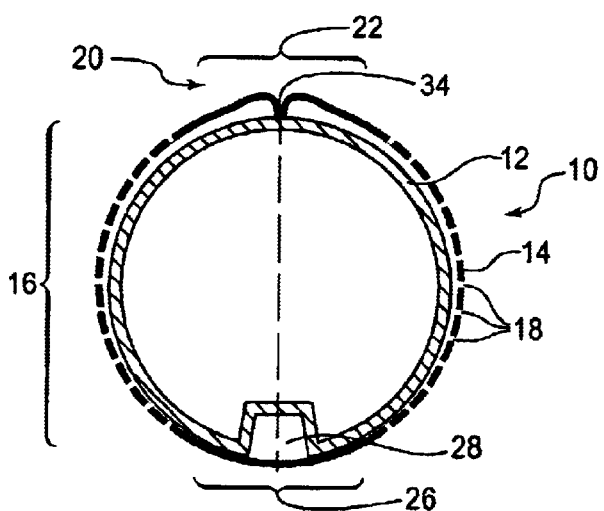
Figure 3C:
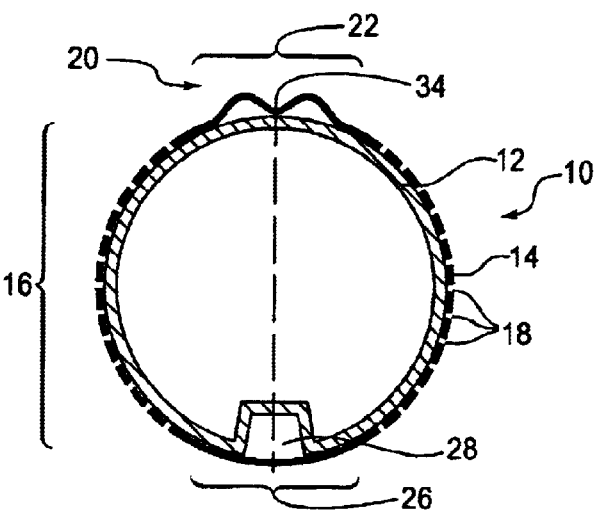

FIG. 3 shows a longitudinal area 34 of membrane 14, in which an impressed camber radius is formed. Area 34 represents a camber directed inwards in relation to the introduction body element. In this case, the crest formed cannot deviate, and additional folds form in the adjacent lateral area, but with the camber facing in the opposite direction. The superfluous circumference of the membrane is divided onto three folds.

Figure 4A:
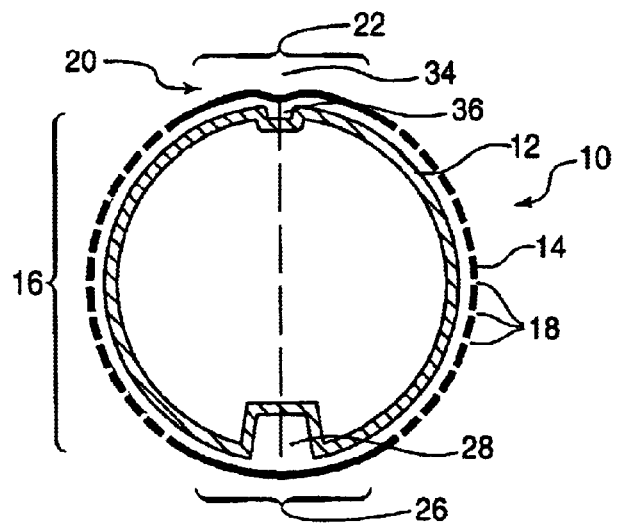
FIGS. 4a–c shows a cross-section through the gasification device of FIG. 3 in three contraction phases with an additional longitudinal groove in the introduction body element.
Figure 4B:
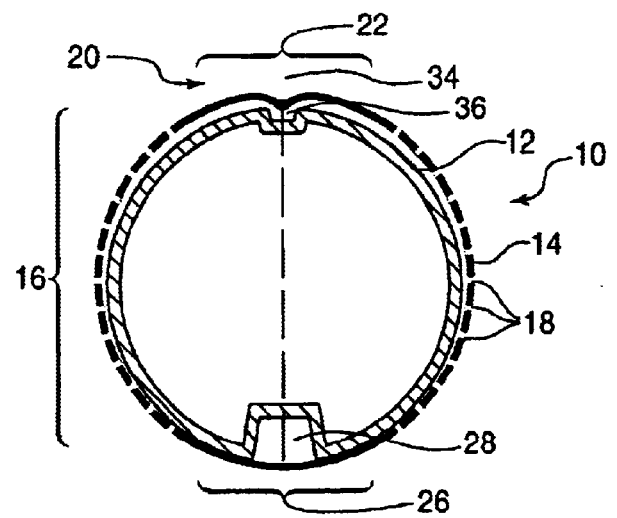
Figure 4C:
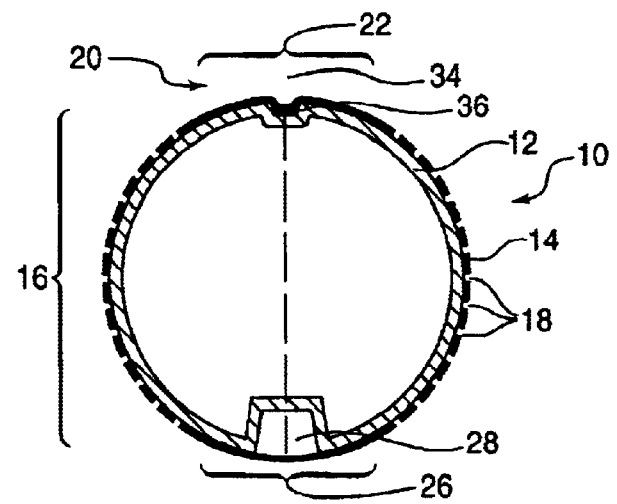

FIG. 4 shows membrane 14, as in FIG. 3. In addition, the embodiment according to FIG. 4 also comprises a longitudinal groove 36 in the area of longitudinal area 34 of membrane 14. The impressed crest can be deflected inwards into longitudinal groove 36 under the influence of the hydrostatic pressure.

Longitudinal area 32 with the camber directed outwards, longitudinal web 24, and longitudinal area 34 with the camber. directed outwards, in combination with longitudinal groove 36, have the effect that membrane 14, initially expanded under the overpressure, and then contracted with the subsequent disconnection of the gas feed, initially bends more markedly on the tendential crest than at other points. This facilitates the formation of folds at this point, which, due to the portion of the hydrostatic pressure becoming greater, finally leads to one single fold.

Parts a, b, and c of FIGS. 1 to 4 show different individual contraction phases. Part a shows the almost expanded state, in which a fold formation is already indicated in the crest of upper area 22 of membrane 14.

Part b shows a transitional state, in which the impressing of the fold is forced. Part c shows the end state, in which the "superfluous" circumferential material of membrane 14 is stored in the fold, while all other areas are located directly at the introduction body element.

Accordingly, while only a few embodiments of the present invention have been shown and described, it is obvious that many changes and modifications may be made thereunto without departing from the spirit and scope of the invention.

What is claimed is:

1. A gasification device for the introduction of air into waste water, comprising:
   at least one blower body element having a perimeter, a vertex of said perimeter, and a bottom of said perimeter opposite said vertex, in an installation position;
   a gas distribution groove at said bottom of said at least one blower body element;
   a membrane surrounding said at least one blower body element and made of an elastic material, wherein said membrane has perforation slits for the introduction of the air into the waste water; and
   a longitudinal area of said membrane at said vertex of said perimeter of said at least one blower body element, and having an impressed camber radius, which is smaller than the mean camber radius of said membrane, measured in the state as mounted on said blower body element, and features a camber directed outwards, related to said blower body element;
   wherein disconnecting an air feed and imposing hydrostatic pressure of waste water, force the creation of an axial fold of said membrane at said vertex, which is free of perforation slits.

2. A gasification device for the introduction of air into waste water, comprising:
   at least one blower body element having a perimeter, a vertex of said perimeter, and a bottom of said perimeter opposite said vertex, in an installation position;
   a gas distribution groove at said bottom of said at least one blower body element;
   a membrane surrounding said at least one blower body element and made of an elastic material, wherein said membrane has perforation slits for introduction of the air into the waste water; and
   a longitudinal ridge that projects from said vertex of said perimeter of said at least one blower body element;
   wherein disconnecting an air feed and imposing hydrostatic pressure of waste water, force the creation of an axial fold of said membrane at said vertex, which is free of perforation slits.

3. A gasification device for the introduction of air into waste water, comprising:
   at least one blower body element having a perimeter, a vertex of said perimeter, and a bottom of said perimeter opposite said vertex, in an installation position;
   a gas distribution groove at said bottom of said at least one blower body element;
   a membrane surrounding said at least one blower body element and made of an elastic material, wherein said membrane has perforation slits for the introduction of the air into the waste water; and
   a longitudinal area of said membrane at said vertex of said perimeter of said at least one blower body element, and having an impressed camber radius, which features a camber directed inwards in relation to said blower body element;
   wherein disconnecting an air feed and imposing hydrostatic pressure of waste water, force the creation of an axial fold of said membrane at said vertex, which is free of perforation slits.

4. The gasification device according to claim 2, wherein said longitudinal ridge is an integral component of said blower body element.

5. The gasification device according to claim 2, wherein said longitudinal ridge is a separate component, which is disposed between said membrane and said blower body element.

6. The gasification device according to claim 2, wherein said longitudinal ridge is secured to an inwards-facing side of said membrane.

7. The gasification device according to claim 2, wherein said longitudinal ridge is disposed on an inwards-facing side of said membrane and is an integral part thereof.

8. The gasification device according to claim 3, wherein a longitudinal groove is arranged in said blower body element in a vicinity of said longitudinal area of said membrane.

9. The gasification device according to claim 3, wherein said camber radius is smaller than a mean camber radius of said membrane in the state as mounted on said blower body element.

* * * * *